United States Patent
Cole et al.

(10) Patent No.: US 6,946,951 B2
(45) Date of Patent: Sep. 20, 2005

(54) SYSTEM AND METHOD FOR INTERROGATING ELECTRONIC LABELS

(75) Inventors: Peter Harold Cole, West Lakes Shore (AU); David Malcolm Hall, Lockleys (AU); Alfio Roberto Grasso, Hectorville (AU); David Bruce Murfett, Fulham Gardens (AU)

(73) Assignee: Tagsys Australia Pty Ltd., South Australia (AU)

( * ) Notice: Subject to any disclaimer, the term of this patent is extended or adjusted under 35 U.S.C. 154(b) by 263 days.

(21) Appl. No.: 10/298,218

(22) Filed: Nov. 18, 2002

(65) Prior Publication Data

US 2003/0151497 A1 Aug. 14, 2003

Related U.S. Application Data

(63) Continuation of application No. PCT/AU01/01676, filed on Jan. 27, 2001.

(30) Foreign Application Priority Data

| Dec. 29, 2000 | (AU) | PR2352 |
| Feb. 14, 2001 | (AU) | PR3072 |
| Aug. 23, 2001 | (AU) | PR7195 |
| Oct. 19, 2001 | (AU) | PR8336 |
| Nov. 19, 2001 | (AU) | PR8945 |

(51) Int. Cl.[7] ............................................. H04Q 5/22
(52) U.S. Cl. .................. 340/10.1; 340/10.2; 340/10.3; 340/10.34
(58) Field of Search ............................. 340/10.1, 10.2, 340/10.3, 10.34

(56) References Cited

U.S. PATENT DOCUMENTS

| 5,467,082 A | * 11/1995 | Sanderson | 340/10.34 |
| 5,548,291 A | 8/1996 | Meier et al. | |
| 5,686,902 A | 11/1997 | Reis et al. | |
| 5,844,942 A | * 12/1998 | Hicks et al. | 375/239 |
| 6,118,367 A | * 9/2000 | Ishii | 340/10.1 |
| 6,249,229 B1 | 6/2001 | Eckstein et al. | |
| 6,700,931 B1 | * 3/2004 | Lee et al. | 375/239 |
| 6,774,766 B1 | * 8/2004 | Moyer | 340/10.32 |
| 2004/0140884 A1 | * 7/2004 | Gallagher et al. | 340/10.2 |

FOREIGN PATENT DOCUMENTS

| EP | 0 902 546 A1 | 3/1999 |
| WO | 92/17866 | 10/1992 |
| WO | WO 02/01246 A2 | 1/2002 |
| WO | WO 02/05504 A1 | 1/2002 |

OTHER PUBLICATIONS

Japanese Patent Abstract No. 2000–209122, Published Jul. 28, 2000.

* cited by examiner

Primary Examiner—Brian Zimmerman
Assistant Examiner—Clara Yang
(74) Attorney, Agent, or Firm—Lowe Hauptman & Berner, LLP

(57) ABSTRACT

The invention provides a system and method for interrogating one or more electronic labels attached to objects, the system including an interrogation device capable of radiating an electromagnetic interrogation signal which contains information in the form of a plurality of symbols, each symbol being represented by a respective time interval between consecutive dips in amplitude of the interrogation signal. The one or more of the electronic labels are capable of detecting and decoding the interrogation signal to recover the symbols, and in response to recovering the symbols generate a reply signal. The reply signal is able to be detected and decoded by the interrogation device. It is envisaged that the invention will find particular use in identifying, sorting, controlling and/or auditing objects having information bearing electronically coded labels.

23 Claims, 8 Drawing Sheets

(a)

(b)

(a) Binary 1

(b) Binary 0

(c) Collision

SYSTEM AND METHOD FOR INTERROGATING ELECTRONIC LABELS

This application is a Continuation of PCT International Application No. PCT/AU01/01676, filed on Jan. 27, 2001 and claims priority to Australian Application Nos. PR2352; PR3072; PR7195; PR8336; & PR8945 filed on Dec. 29, 2000; Feb. 14, 2001; Aug. 23, 2001; Oct. 19, 2001 & Nov. 19, 2001.

FIELD OF THE INVENTION

The present invention relates to an electronic labelling system suitable for use in object management. It is envisaged that the invention will find particular use in identifying, sorting, controlling and/or auditing objects having information bearing electronic labels.

BACKGROUND OF THE INVENTION

Electronic labels are devices which are able to be attached to various objects so that information relating to these objects, stored on the electronic label, may be easily obtained. Therefore, one may affix labels to objects such as assets, animals, and people so that the information may be obtained using a wireless device such as an interrogator.

An electronic labelling system for managing objects having electronically coded labels may be of a type in which information passes between an interrogator, which creates an electromagnetic interrogation field, and electronically coded labels ('the labels') which are able to respond by issuing a reply signal which is able to be detected by the interrogator and possibly supplied to other apparatus.

In normal operation the labels may be passive (that is, the labels have no internal energy source and obtain energy for their reply from the interrogation field), or active (that is, the labels contain an internal energy source, for example a battery) and respond only when they are within, or have recently, passed through the interrogation field which may have the function of signalling to an active label when to commence a reply or a series of replies.

It appears that a common problem in existing electronic label systems is that when an unknown plurality of labels are simultaneously present in an interrogation field, a communication process between the interrogator and label may be required to be structured so that all of the labels present in the interrogation field are able to be detected, often within a short time.

A protocol for communicating with an unknown plurality of labels simultaneously present in an interrogation field may be of the type described in patent application PCT AU 92 00143 (the '143 application). The '143 application describes a protocol in which labels may repeat their replies intermittently and at varying intervals with spaces between the replies significantly greater than the duration of a reply, so that over time all replies may be detected without interference. Whilst the protocol described in the '143 application has an advantage of requiring little or no signalling for the interrogator, the protocol exhibits poor performance when there is a large number of labels simultaneously in the interrogation field.

In other multiple label read protocols, significant signalling from the interrogator to each label is often required. Here, because of a need to keep label circuits simple, interrogator signalling may be performed by amplitude modulating an interrogator powering and carrier signal ('the interrogator signal') to provide 'dips' in interrogation carrier power. In this respect, reference to the term 'dips' throughout this specification is to be understood to be reference to a localised minima in the interrogator signal amplitude which have been produced by amplitude modulating the interrogator powering and carrier signal using a modulating signal which includes command or data content.

When the interrogator powering and carrier signal frequency is too high to provide a convenient time reference in a label circuit, an oscillator (herein referred to as an 'on-chip oscillator') included in the label, may provide the timing reference against which details of interrogator signal dips are able to be examined to extract command or data content. However, due to manufacturing tolerances and/or substantial variation in excitation levels experienced by labels as they pass through the interrogation field at various orientations, on-chip oscillators may suffer from poor frequency stability. Such poor frequency stability may make the label susceptible to extracting incorrect command or data information from the interrogator signal.

Existing electronic labelling systems attempt to solve this problem by beginning the interrogator signalling with a long period fixed frequency amplitude modulation signal for training the on-chip oscillator to a standard frequency. However, time taken to train the on-chip oscillator inhibits rapid execution of multiple label reading algorithms. Moreover, such a solution imposes a significant burden on attempts satisfy electromagnetic compatibility regulations, which generally do not permit much signalling by the interrogator.

In relation to approaches adopted by existing electronic labelling systems to satisfy the electromagnetic compatibility regulations, existing systems utilise interrogator amplitude modulation pulses having a substantial width, so that shaping to allow out of band sideband reduction can be employed. In such approaches, the dips may take the form of raised cosine pulses on substantial base lines, or long rise and fall times may be applied to previously rectangular pulses, or various forms of low pass filtering may be applied to a modulation envelope.

These solutions have, however, the substantial disadvantage of requiring a significant size reservoir capacitor in a rectifier circuit included in the label, so that label circuits can be sustained with operating power during the period of the wide interrogator signal dips.

In light of the preceding discussion it can therefore be appreciated that there appear to be numerous problems associated with electronic labelling systems. It is thus an aim of the present invention to ameliorate these deficiencies.

SUMMARY OF THE INVENTION

In very broad terms the present invention provides a system and method for interrogating a plurality of electronic labels located within an interrogation field, the interrogation field being provided by an interrogation device using an interrogation signal. The interrogation field inducing a voltage in each electronic label which provides a power signal to the electronic labels. In response to obtaining the power signal, each of the electronic labels is able to decode the interrogation signal to obtain symbols, each symbol being represented by a respective time interval between consecutive dips in amplitude of the interrogation signal. In response to interpreting the recovered symbols, each electronic label is able to generate a reply signal which is able to be detected and decoded by the interrogation device.

Therefore, according to a first aspect of the present invention, the present invention provides a system for interrogating one or more electronic labels, each label being attached to an object, the system inducing an interrogation device capable of providing an interrogation field using an interrogation signal, the interrogation signal containing information in the form of a plurality of symbols, each symbol having at least one time interval between consecutive dips in amplitude of the interrogation signal, each time interval having a value from a finite set of values, the values ranging from a minimum to a maximum value, adjacent values having a higher to lower value ratio which exceeds a predetermined amount, wherein one or more of the electronic labels located within the interrogation field detect and decode the interrogation signal to obtain a power signal and a data signal, the data signal including the symbols, the electronic labels using the power signal to interpret the recovered symbols and in response to interpreting the symbols generating a reply signal, the reply signal being able to be detected and decoded by the interrogation device.

Preferably, the predetermined amount exceeds an amount which is determined using a frequency variation of an on-hip oscillator on board each of the electronic labels, the frequency variation being proportional to operating power generated by the electronic label due to movement of the electronic label with respect to the interrogation device. In a particular form of the invention, the predetermined amount exceeds 1.5. In an alternative form of the invention, the predetermined amount exceeds 2.0.

According to the preferred embodiment of the present invention, each electronic label will preferably include:
(a) an antenna for sensing the interrogation signal to provide a sensed signal;
(b) a combined dip detection and power supply circuit, the combined dip dip detection and power supply circuit being electrically connected to the antenna, the dip detection and power supply circuit being capable of converting the sensed signal into the power signal and the data signal;
(c) an on-chip oscillator for providing a timing signal,
(d) an interval counter, the interval counter using the timing signal to determine time intervals between consecutive dips in the data signal;
(e) a reply signal generation circuit for providing the reply signal; and
(f) a transmitter for radiating the reply signal;
wherein the reply signal is generated in response to demodulating the data signal, the demodulation of the data signal providing symbols which are able to be interpreted by the reply generation circuit.

In a preferred form, the on-chip oscillator timing signal is not synchronised to the interrogation signal.

In a preferred embodiment of the invention, the dip detection and power supply circuit includes a first and second input port, the first input port being coupled to both an anode of a first rectifier diode and an anode of a second rectifier diode, a cathode of the first rectifier diode being coupled to both a first terminal of a first reservoir capacitor and a first input of a comparator, a cathode of the second rectifier diode being coupled to both a first terminal of a second reservoir capacitor and a second input of the comparator, a second terminal of the first reservoir capacitor and a second terminal of the second reservoir capacitor both being coupled to the second input terminal, where in response to receiving an interrogation signal the comparator provides an output pulse during an interrogation signal dip but no output during slow variations in interrogation signal levels.

In a preferred form of the present invention, the first reservoir capacitor and the second reservoir capacitor have a substantially different capacitance.

In a preferred form of an electronic label suitable for use with the present invention, the electronic label further includes on board memory.

In a particular form of the invention, the available types of symbols include:
(a) start of field symbol;
(b) binary one symbol;
(c) binary zero symbol; and
(d) end of field symbol.

In one form of the invention, where the predetermined value is used for distinguishing between time intervals for a binary one symbol and a binary zero symbol, the predetermined value is obtained using a time interval contained in the start of field symbol.

In a preferred embodiment of the present invention each dip in a pair of consecutive dips corresponding to a symbol has a pulse width which is substantially less than the time interval between the consecutive dips.

Ideally, each dip has rise and fall times which are substantially less than the pulse width of the dip.

In one form of the invention, the time interval between consecutive dips associated with a symbol is determined using the time difference between respective leading edges.

Preferably, the interrogation device shapes the amplitude of the interrogation signal so as include a localised maxima immediately preceding a rising edge and/or a localised maxima immediately following a falling edge associated with a dip.

In one form of the invention, the interrogation signal shaping device is a band pass filter. In an alternative form of the invention, the interrogation signal shaping device is a low pass filter.

According to a second aspect of the present invention, there is provided a method of interrogating a plurality of electronic labels, each label being attached to an object, using an interrogation device, the method including:
(a) the interrogation device generating an interrogation signal;
(b) the interrogation device transmitting the interrogation signal, the interrogation signal containing information in the form of a plurality of symbols, each symbol being represented by a respective time interval between consecutive dips in amplitude of the interrogation signal, each time interval having a discrete value from a range of a minimum to a maximum value, adjacent values having a higher to lower value ratio which exceeds a predetermined value;
(c) one or more electronic labels receiving the interrogation signal and decoding the received signal to obtain a power signal and a data signal, wherein the decoding of the received signal to provide a data signal includes decoding symbols from the received interrogation signal by distinguishing the time intervals between consecutive dips in the interrogation signal;
(e) each of the one or more receiving electronic labels responding to the interrogation signal.

In a one form of the present invention, the interrogation signal includes at least one command, the interrogation signal further includes command dependent information.

Preferably, the available types of commands include:
(a) enter active state command;
(b) close empty slot command;
(c) error command;
(d) decoding error command;
(e) begin new slot command;
(f) change round size command; and
(g) begin new round command.

Ideally, the commands include error protection data which is independent of error detection data which is used to protect other data transmitted to the electronic labels.

In a preferred embodiment of the invention, in response to decoding a begin new round command, the step of responding to the interrogation signal includes:

(a) each of the one or more receiving electronic labels entering an active state;
(b) each receiving electronic label selecting a slot number from a maximum number of slots, wherein the slot number is representative of a period during which the receiving label is to reply to the interrogation signal;
(c) each of the receiving electronic labels generating a reply signal;
(d) the receiving electronic labels comparing a current slot number with the selected slot number;
(e) in response to the current slot number equalling the selected slot number a receiving electronic label transmitting the reply signal;
(e) the interrogation device receiving the transmitted reply signals.
(e) the receiving electronic labels entering a retired state;

In the preferred embodiment of the invention, the current slot is controlled by the interrogation device. In one form of the invention, the maximum number of slots in a round is stored within memory on board the electronic label. In another form of the invention, the maximum number of slots in a round is contained within intorrogator commands transmitted to the electronic labels.

In one form of the invention a begin round command may further include a label selection command. In this form of the invention, only electronic labels having a parameter which matches a label selection parameter contained in interrogation commands are able to respond to the interrogation commands.

In one form of the invention, where the a begin round command includes a label selection command, data associated with the label selection command may not include protection In one form of the invention, the interrogation signal uses 1 in m pulse position or interval modulation. In this form of the invention, each electronic label includes a Gray code counter which is able to be used to decode the interrogation signals.

Ideally, the reply signal generated by an electronic label contains data dependant period of silence positioned so that reply signals from other electronic labels having different data occupy the positions of silence.

It will be recognised that the present invention includes a number of advantages in that the system and method is able to deployed using electronic labels which include small sized reservoir capacitors thus reducing the physical size of the electronic labels.

In addition, the invention provides an interrogation signalling scheme which is able to sustain operation of the electronic label through the occurrence of a dip and a decoding methodology which is able to reduce the frequency of unrecognised errors.

Furthermore, the present invention provides label selection procedures and label reply procedures that will facilitate rapid reading of a large number of selected tags per second.

BRIEF DESCRIPTION OF THE DRAWINGS

The present invention will now be described in relation to various embodiments illustrated in the accompanying drawings. However, it must be appreciated that the following description is not to limit the generality of the above description.

In the drawings.

DETAILED DESCRIPTION OF THE INVENTION

Figure 1:
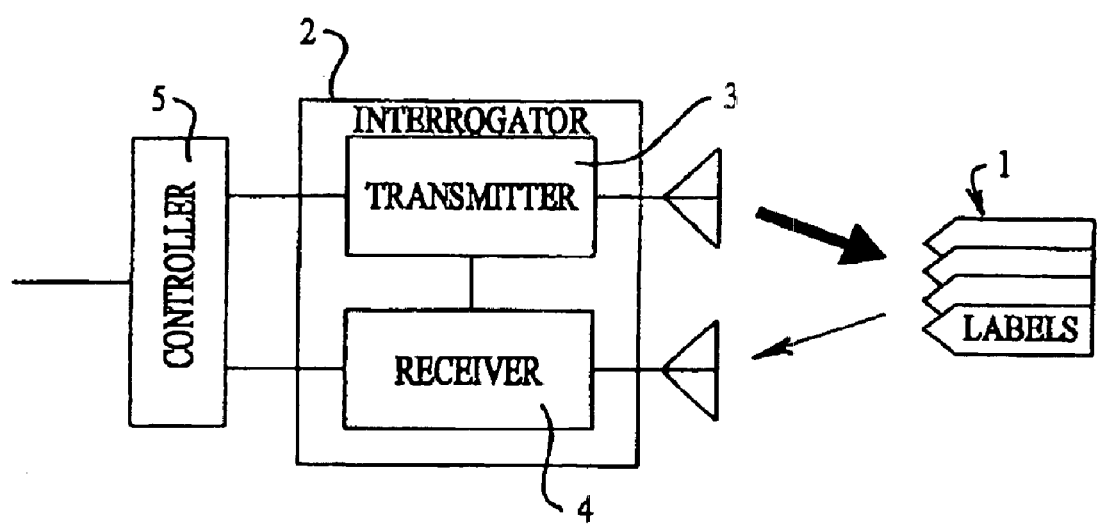
FIG. 1 is a block diagram of a multiple electronic label reading system according to a preferred embodiment of the present invention.

FIG. 1 shows in general an outline a system in which a group of labels 1 is able to be interrogated by an interrogator 2 containing a transmitter 3 for generation of an interrogation signal which can supply power and information to the labels. The interrogator 2 also includes a receiver 4 for receiving reply signals from the labels 1 and for decoding that signal. The interrogator 2 preferably operates under the control of a controller 5 which is able to provide the decoded signal to external apparatus, and also manage an interrogation process.

Figure 2:
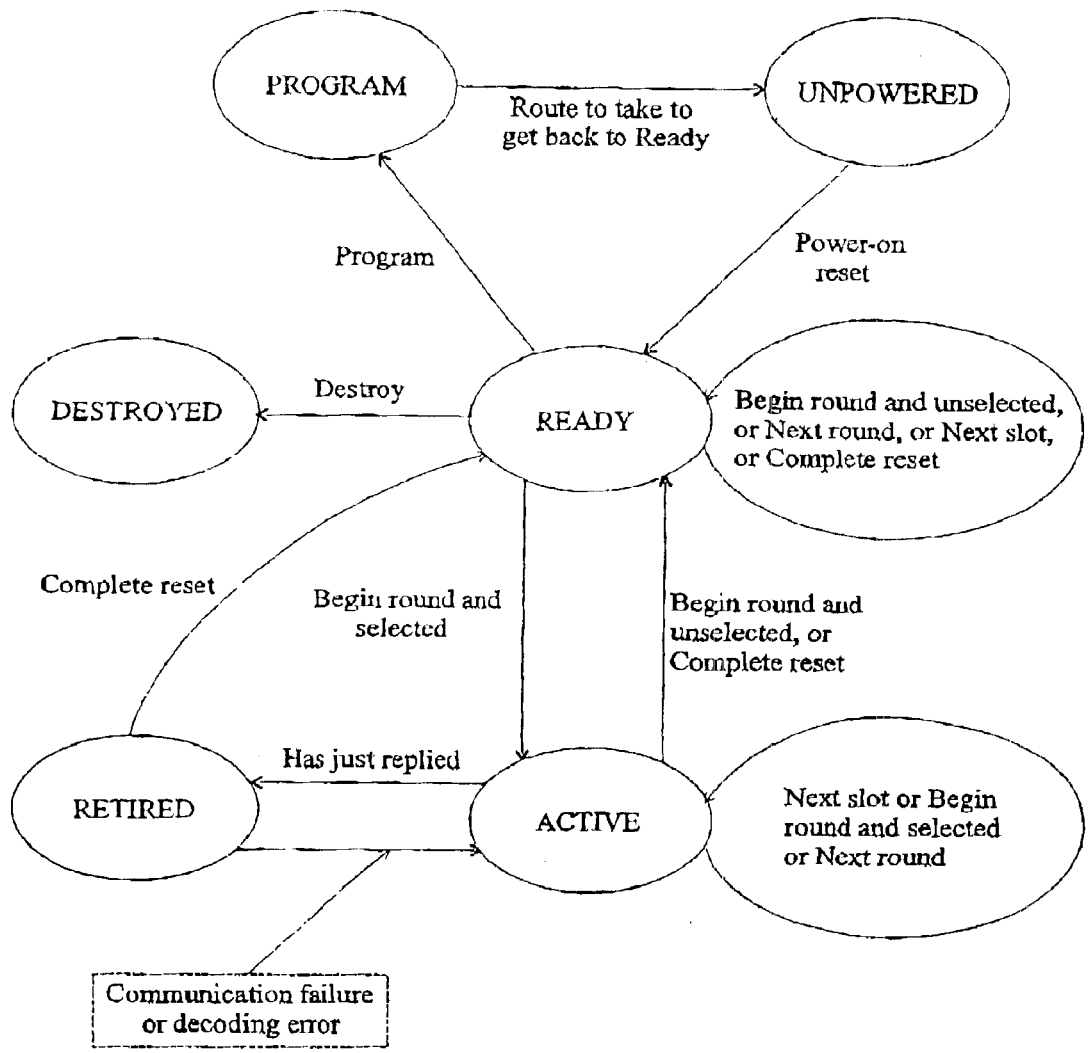
FIG. 2 is a state diagram showing label states in a multiple label reading protocol suitable for use with the preferred embodiment of FIG. 1.

An illustration of a preferred embodiment of the STAR protocol is provided in FIG. 2. In this embodiment, labels reply in time intervals referred to as slots which have their beginning and end under interrogator 2 control. An interrogator command may signal both the end of the current and the beginning of the next slot.

Labels which enter an interrogation field created by the interrogation signal, wait until they have sufficient power for operation, before replying, in a READY state for the reception of a Begin Round command, which may include a Label Selection command, from the interrogator 2. Such waiting constitutes a system operation which is consistent with what is known in the electronic labelling industry as the Reader Talks First (RTF) operating mode.

In this protocol the label having received a Begin Round command possibly including a Label Selection command enters a state which is referred to as the ACTIVE state, and then chooses at random a slot number in which to offer a reply out of a maximum number of slots in a serial group of slots referred to as a round. The number of slots in the round may be known to the label by any mechanism of internal information storage, or by an instruction carried within an interrogator command.

Reply conditions within a slot can be separated into three categories:
(a) no label reply present ('the first case');
(b) one label reply present ('the second case'); and
(c) two or more label replies present ('the third case').

The first case is known to the interrogator 2 by its waiting for a time known to the system in which a label reply should have commenced, and by its observing from an examination of the amplitude of signals in the receiver 4 that no reply has in fact commenced, If no label reply is present the interrogator 2 may issue a close slot command which signals to all active labels (that is, those labels which have woken up and are therefore waiting for a match in their reply slot number and the current slot number in order to reply) to increment their current slot number.

In the second case, the label after having completed its reply enters into a state which is referred to as the RETIRED state. In this state the label no longer offers a reply even if there is a future match in its reply slot number and the current slot number. In this way this label has been eliminated from an active label population currently present in the interrogation field.

The interrogator 2 then signals to end the current slot and begin the next slot. If there was an error in the reply the interrogator 2 issues an error signal which causes a label which has just replied to exit the RETIRED state and enter the ACTIVE state. The label, having entered the ACTIVE STATE, will wait out the rest of the current round and then, for the next round, calculate another random reply slot out of the maximum number of slots which are available for that new round.

The third case is able to be identified by a property, to be explained below, of a modulation used in the label reply. In this case the two or more overlapping label replies are left to complete their replies after which the interrogator 2 issues an Error signal. Similarly to the situation as described for the second case, these labels will reply again next round, wherein they will have only a small probability of repeating their collision.

In the preferred form of the present invention, each label includes on-board memory which is able to store identification data. The identification data may include data which is representative of a manufacturer and/or a label owner and/or or an object type. Thus, the labels may have a selection feature in which groups of labels may be selected using the identification data. The interrogator 2 therefore has a selection command which is able to contain label selection data ('the selection data').

Thus, having received and decoded an interrogation signal which includes a selection command having label selection data, a label may compare the selection data with the label identification data on a bit by bit basis, either Most Significant Bit (MSB) first or Least Significant Bit (LSB) first.

When signalling of the selection data from the interrogator 2 stops, labels having identification data which matches the selection data are 'selected'. Labels which had a mismatch in 1 or more bits are 'not selected'.

In a preferred embodiment, a selected label which subsequently offers a reply, will reply with the remaining contents of the identification data, omitting the identification data used to select the label, and a cyclic redundancy code (CRC) which corresponds to the concatenation of the data used in the label selection and the data contained in its reply. This CRC will preferably be stored within the label memory, however, the CRC may be dynamically generated as part of an overall transaction.

A significant advantage of the above selection implementation is that label reply time is saved as the label reply need not contain any data broadcast by the interrogator 2 as part of label selection. The CRC also provides a measure of protection against communication errors caused by electromagnetic noise which causes interruptions in the interrogation field.

To properly manage reply rounds (and to coexist with other standards) a number of interrogator commands may be required. Examples of interrogator commands which may be provided by the present invention include:
a. enter active state command;
b. close empty slot command;
c. error command;
d. decoding error command;
e. begin new slot command;
f. change round size command; and
g. begin new round command.

Other interrogator commands may also be provided, such as interrogator commands concerned with selecting a subset of labels to be included in a reply round.

Commonly information is transmitted in widths or positions of pulses against a fixed time reference. As explained above, when the interrogator powering and carrier signal frequency is too high to provide in the label circuit a convenient time reference, as generally occurs in the UHF band, an on-chip oscillator may provide a timing reference against which details of interrogator signal dips are examined to extract their data content.

Stability of frequency of such oscillators in the face of manufacturing tolerances and the substantial variation in excitation level experienced by labels as they pass through the interrogation field at various orientations presents problems in the extraction of correct information.

As will be explained below, in a preferred form of this invention, adoption of signalling patterns in which the timings for different symbols are made substantially different, appears to solve this problem.

Interrogator commands are typically formed from Start Of Frames (SOF), binary or m-ary (m bits per symbol) data and End Of Frames (EOF). The SOF and EOF are violations in the signalling of normal data and are therefore able to be distinguished from normal data.

Figure 3:
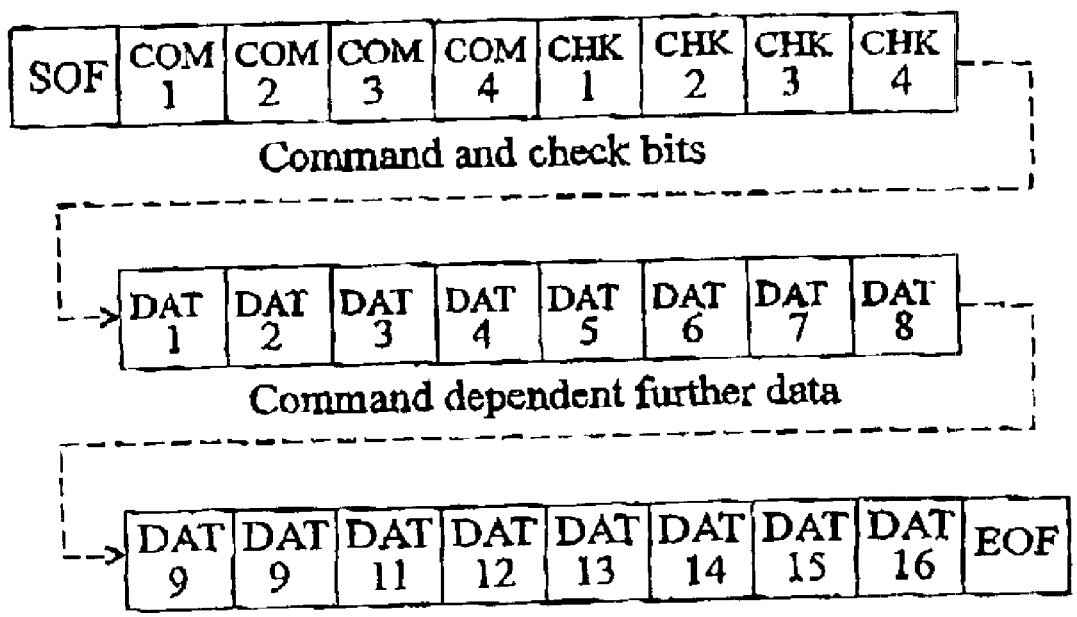
FIG. 3 is an example data structure of an interrogation signal communicated from the interrogator to the electronic labels.

Sometimes a command alone is needed and sometimes data is required to follow a command. In a preferred embodiment, the structure for commands and data may be as shown in FIG. 3. In contrast to the usual situation found in the prior art wherein protection against signalling errors is provided by appending a CRC to the end of an interrogator signalling stream of significant length, in this invention commands may form a single byte, and error protection for that command alone may be provided by incorporating check bits within that single byte. In some cases there may be attached a data stream containing a CRC on the data or the combination of the data and command, but in a preferred embodiment of the invention, oriented to extreme label circuit simplicity, such checking is omitted from the data stream.

Checking integrity of data transmission from the interrogator 2 is able to be performed by the inclusion of a CRC within the label reply. The CRC may be calculated using both transmitted and received data. In a preferred embodiment, well suited to the achievement of label circuit simplicity, the CRC may be pre-loaded into memory on board the label, and does not need to be dynamically calculated.

A preferred embodiment of interrogator signalling may use separate symbols for SOF, EOF, 1, and 0. These symbols may be distinguished by the pulse width or by the spacing between pulses.

In a preferred embodiment of the present invention, interrogator signalling may use a unitary pulse which forms symbols by varying the time between pulses to create SOF, EOF, 1, and 0 symbols. Such signalling is illustrated in FIG. 4.

In an alternative embodiment of the present invention, a unitary pulse which forms symbols by varying the time between pulses, to create SOF, EOF, and m-ary symbols (m bits per symbol), may be used.

Figure 4:
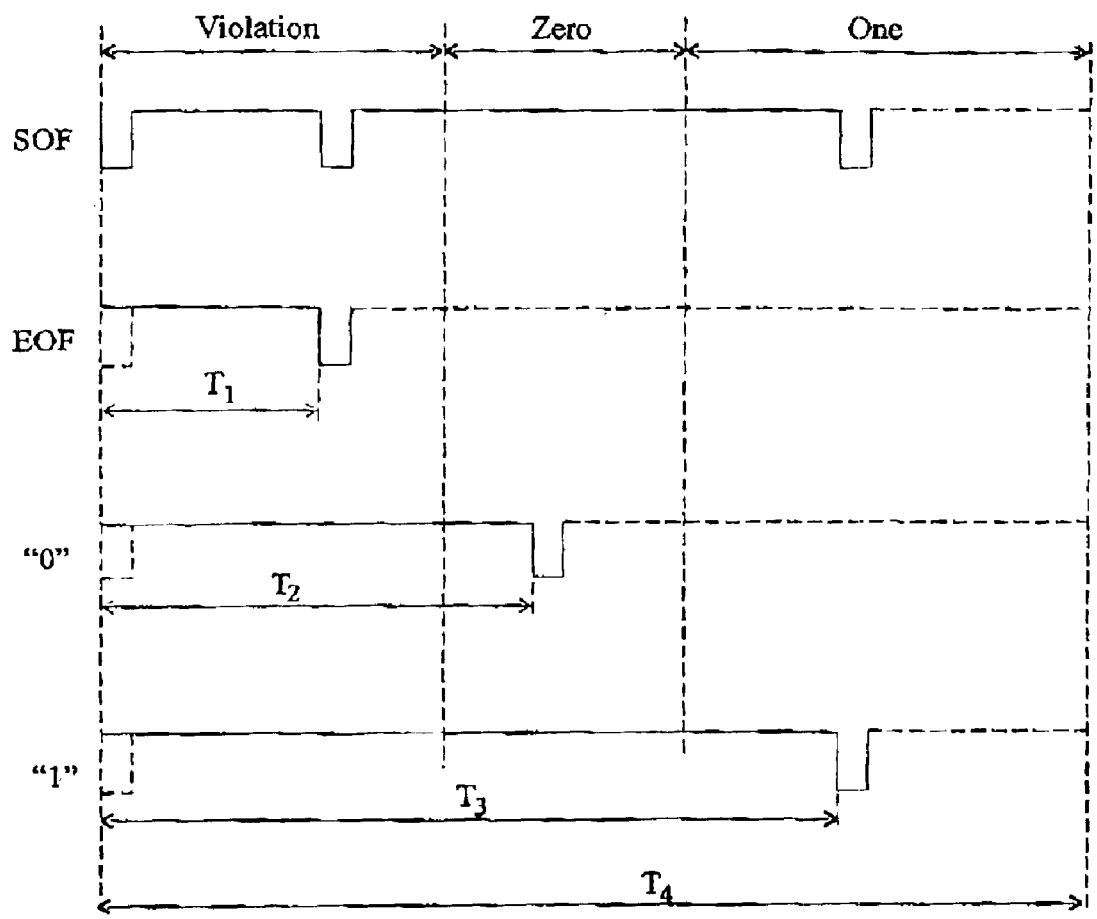
FIG. 4 in an example of interrogator signalling using dips in interrogator signal envelope.

When a basic signalling pattern is decided upon, which pattern may be as shown in FIG. 4, it is advantageous to restrict and to modify the signalling pattern in several possible ways which will be described later. Part of that description will include an explanation of why it is advantageous to employ very short interrogation signal dips.

Another part of that description will explain why the time delays between dips for different symbols should vary substantially.

Figure 5:
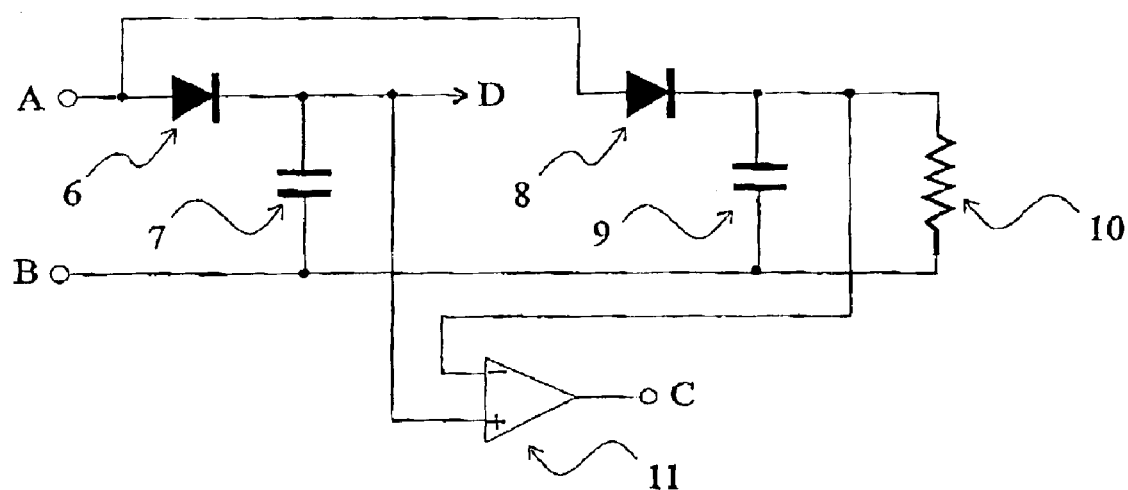
FIG. 5 is a schematic diagram of an interrogator dip detection circuit suitable for use in a preferred embodiment of the present invention.

A circuit for detection of interrogator signalling dips, particularly short ones as may be used in a preferred embodiment of the invention, is given in FIG. 5.

In that circuit an alternating signal at the interrogation frequency is received at a pair of terminals A and B and is converted to d.c. energy in a first rectifier containing a diode 6 and reservoir capacitor 7. That rectifier supplies energising power to the remainder of the chip circuits via terminals marked as D and B.

The reservoir capacitor 7 is made sufficiently large for it to supply without undue voltage sag energising power to the label circuit during the interrogator signalling dips. In the circuit the signal at the interrogation frequency received at terminals A and B and is also converted to d.c. energy in a second rectifier containing diode 8 and reservoir capacitor 9. Capacitor 9 is made sufficiently small for the voltage across it to fall rapidly, when the interrogation signal undergoes one of its dips, under the influence of a load represented by circuit element 10 which may be a real resistor as depicted in the figure, a controlled current drain, or some other suitable electrical load mechanism.

The different behaviours of the two rectifiers allows the comparator 11 to produce at terminals C and B of FIG. 5 an output pulse during a short interrogation signal dip but negligible output during the slow variations in interrogation signal level which occur when the label progresses normally through the interrogation field.

The recent emergence of standards for an Electronic Product Code, and other standards intended to promote for widespread adoption of RFID labels, requires the development of very low cost remotely interrogatable electronic labels. To achieve the required low cost small microcircuits are required.

The requirement of simplicity of label circuits is such that it leads, as already explained, to information from the interrogator 2 to the label being signalled by amplitude modulation of the interrogator signal, such signalling being normally accomplished by having dips in the amplitude of the interrogator signal.

During the period of a dip, label circuits are as already explained sustained by energy stored in the reservoir capacitor of the rectifier shown a capacitor 7 in FIG. 5. Dips should be maintained short to minimise the size of the reservoir capacitor. The result is that in the preferred embodiment of the invention interrogation signalling dips are short in relation to their spacing.

It is also an advantage if the rise and fall times of the dips can be kept short in relation to their duration, as such shaping enhances the quality of the output of a dip detection circuit 11 of FIG. 5. Such shaping forms a significant contrast to that of the prior art.

It is also helpful from this point of view if the dips can be preceded by and followed by a period of slightly greater interrogator signal amplitude to provide extra charge on the reservoir capacitor before it enters the unpowered period, and to provide also rapid replenishment of that charge at the conclusion of a dip.

Figure 6:
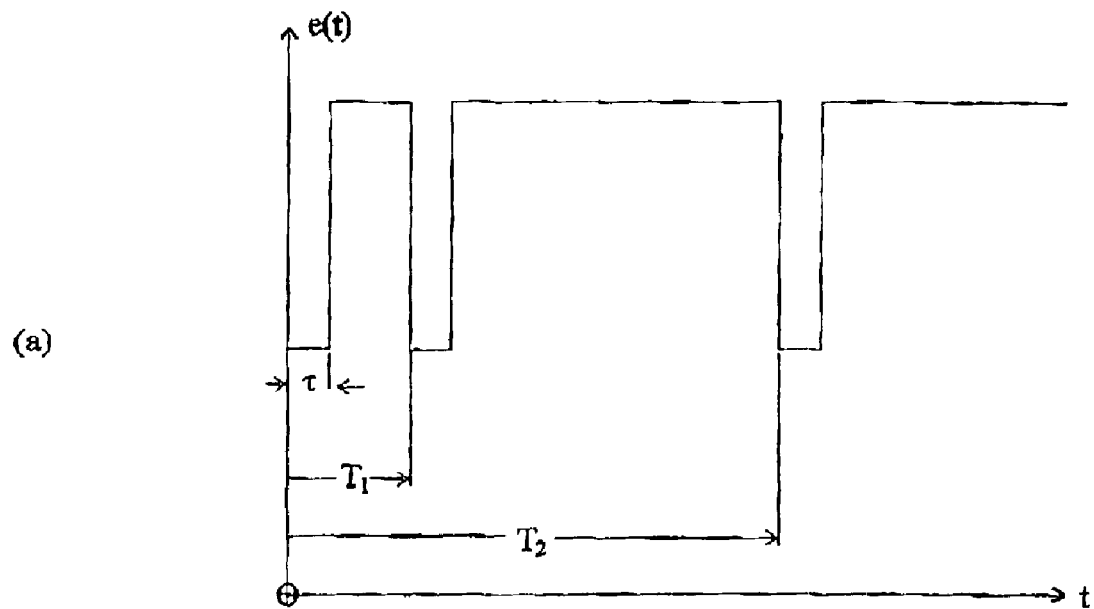
FIG. 6(a) is a signal diagram of an interrogation signal not having shaped dips.
FIG. 6(b) is a signal diagram of an interrogation signal having shaped dips in accordance with a preferred embodiment of the present invention.
Figure 6:
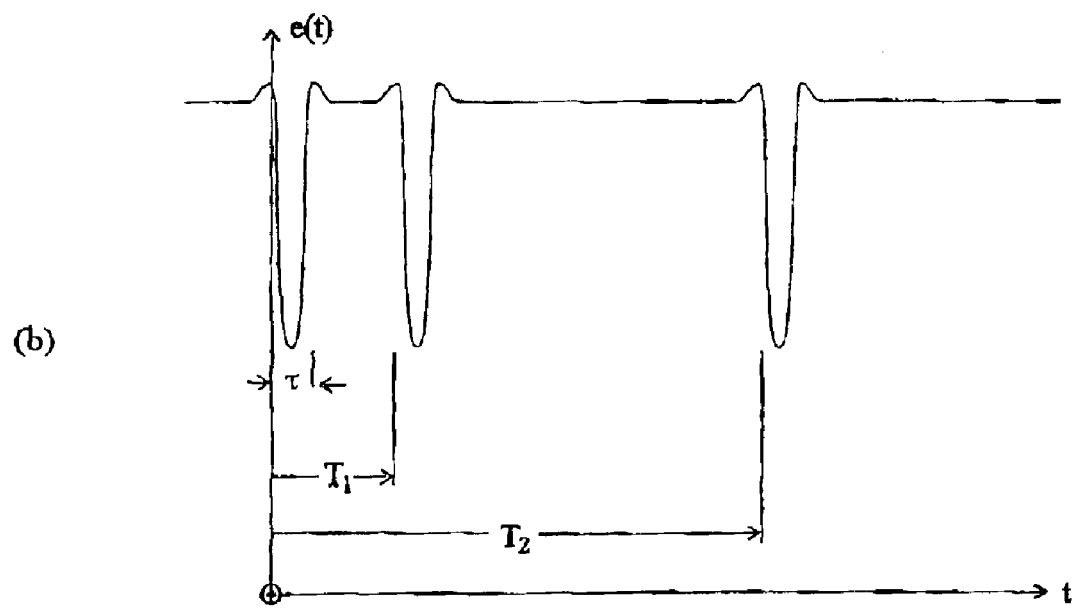

FIG. 6(b) shows the preferred form of dips that are used in a preferred embodiment of the present invention in place of the unshaped dips shown in FIG. 6(a).

Such modifications to shape can also be useful in shaping the interrogator signalling spectrum to satisfy electromagnetic compatibility regulations.

The modification of the dip shape is useful in minimising side bands surrounding the interrogator carrier outside of a band set by the regulations. Such bands can be of width 50 kHz in some regulations or as wide as 250 kHz in others. The side bands suppression required can be as little as 20 dB for single spectrum line or greater than 60 dB for other regulations for the whole out of band signalling power.

Such suppression can be achieved by the choice of dip parameters, by the relationship of the pattern between the dips and the use of duty cycle as described later.

For the design of label circuits, there are advantages in always timing from a falling edge. These derive from the different loads that are provided to the input terminals A and B of FIG. 5 when signal amplitudes are rising or falling, this difference leading to different rise and fall times of rectifier outputs, which difference complicates detection of pulse widths, but not the detection of spacings between falling edges.

For the design of label circuits, there are also advantages maintaining dip separations in which the ratios T2/T1, T3/T2, and T4/T3 of FIG. 4, of the dip positions are significantly different for different symbols. With currently available technologies, a suitable ratio is 1.5 or greater. These advantages derive from the fact that correct detection of interrogator signalling symbols even in the face of significant uncertainty in the frequency of on-chip oscillators, may begin immediately upon the reception of signalling from the interrogator 2, without the necessity of waiting for an oscillator frequency training period. Such immediate detection is important for rapid operation, in terms of labels read per second, of protocols such as the STAR protocol which can perform, with signalling from the interrogator 2 which is both rapid and economical from an electromagnetic compatibility point of view, a high number of labels read per second.

It can also be shown there is an advantage of having interrogator signal spacings which are multiples of the dip width $\tau$ (ref FIG. 4). This will result in nulls of a Fourier transform of a single pulse coinciding with some peaks of a Fourier series associated with pulse positions, and avoid the generation of excessive amplitude spectrum lines. This is of advantage in some EMC jurisdictions.

One of the techniques for minimising side band levels in a repeated signalling pattern is to choose, for the most commonly employed commands, signalling sequences with only a few pulses, this choice leading to a low duty cycle. Pursuing this policy, in a preferred embodiment of the invention, the close slot and next slot signals may be signalled by a single isolated dip.

With the form of signalling described, it is possible in a further embodiment of the invention to make use of the timings T1 and T3 of the SOF symbol to make a calculation of an appropriate boundary to be used within the label for classifying the subsequent symbols as either binary 0 or binary 1. In contrast to the results from techniques employed in the prior art to cope with on-chip oscillator frequency variation, this estimate may be made without further delay to signalling, or further burden to the electromagnetic compatibility constraints which regulate the signalling.

Figure 7:
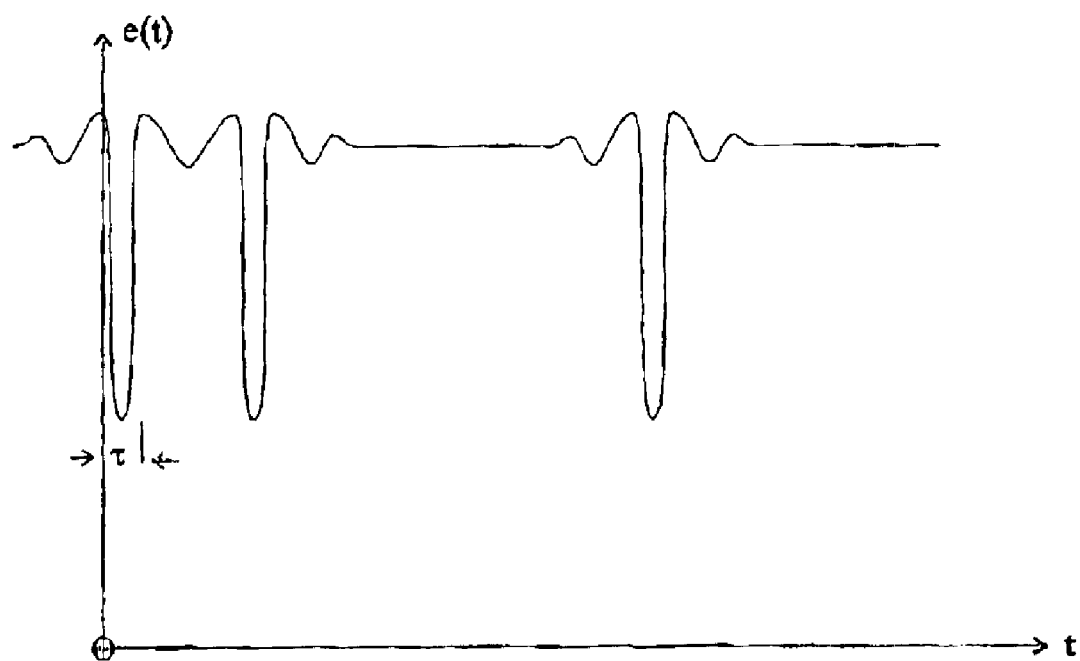
FIG. 7 is a diagram of a deliberate steep skirted restriction in the time domain, of deliberate steep skirted restriction of the spectrum of the interrogator signal in the frequency domain.

Another advantageous modification of the rectangular dips shown in FIG. 6(a) is shown in FIG. 7, wherein is shown the result, in the time domain, of deliberate steep skirted restriction of the spectrum of the interrogator signal in the frequency domain. A number of filter techniques are available for such restriction. These include continuous time domain filtering techniques, and sampled data techniques, practiced on base band signals before up conversion to a final interrogator carrier frequency band, or directly on the interrogator transmission signal at the final interrogation frequency carrier.

The shapes of resulting waveforms shown in FIG. 7 are fully consistent with the correct operation of the circuit shown in FIG. 5, and provide also the previously discussed benefits of having some moderate pre shoot and post shoot in the interrogation signalling waveform.

The generation of a label reply signal is normally accomplished by modulation, by circuits with the label, of the interrogation frequency powering carrier signal, so that a portion of the energy received by the label is scattered back from the label in a modulated form.

The modulation used by the label may have periods where the label is periodically loading and unloading its antenna for power receiving or for signal reflection, this operation being commonly referred to as backscatter, or periodically varying or not varying the amplitude of the signal produced by its re-transmitting device in the case of a non-backscatter or non-lectromagnetic label. In consequence there may be periods where no backscatter, reflection, or transmission occurs. The reply may thus be encoded with regions of modulation and regions of silence which may be within a bit signalling period, or may form any other duty cycle of modulation and silence over any number of bits.

In this way an apparent reply which can appear in the receiver of the interrogator as a result of superposition of two or more simultaneously replying labels (each containing different reply data), may, as will be explained shortly, exhibit an error.

The reply signal modulation method to be described has a particular advantage in protection against what is commonly referred to as the small signal capture or suppression effect, an effect whereby the received signals of two or more simultaneously replying labels which have large differences in their amplitudes results in the identification of only the larger amplitude reply when a modulation scheme without periods of silence is used. This type of error detection scheme works for modulation frequencies which may be synchronous to the interrogation field, may be approximately synchronous to an interrogator timing signal, or may be asynchronous in that they are self timed by the label's electronic circuits.

Figure 8:
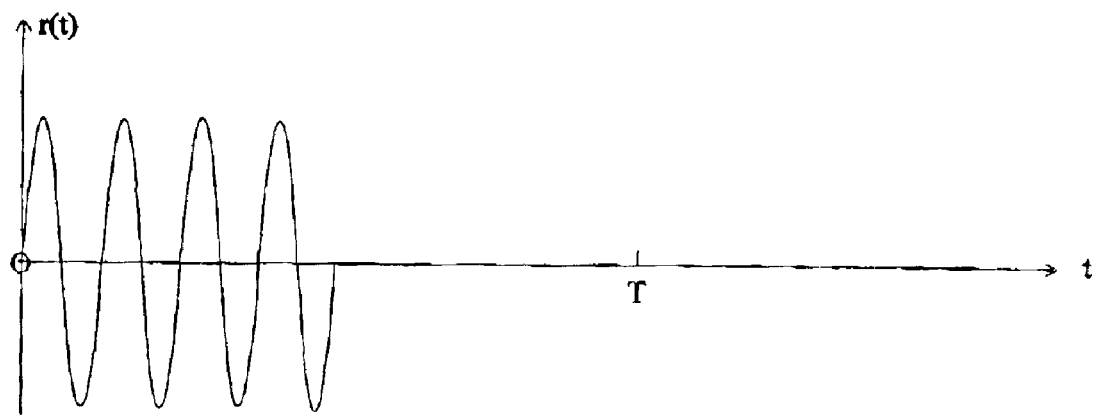
FIG. 8(a) shows an example of a label reply modulation which may be used for collision detection in a baseband modulation detected in an interrogator when a binary 1 is signaled.
FIG. 8(b) shows an example of a label reply modulation which may be used for collision detection in a baseband modulation detected in an interrogator when a binary 0 is signalled.
FIG. 8(c) shows an example of a label reply modulation which may be used for collision detection in a baseband modulation detected in an interrogator when different labels signal a binary 1 and a binary 0 at the same time.
Figure 8:
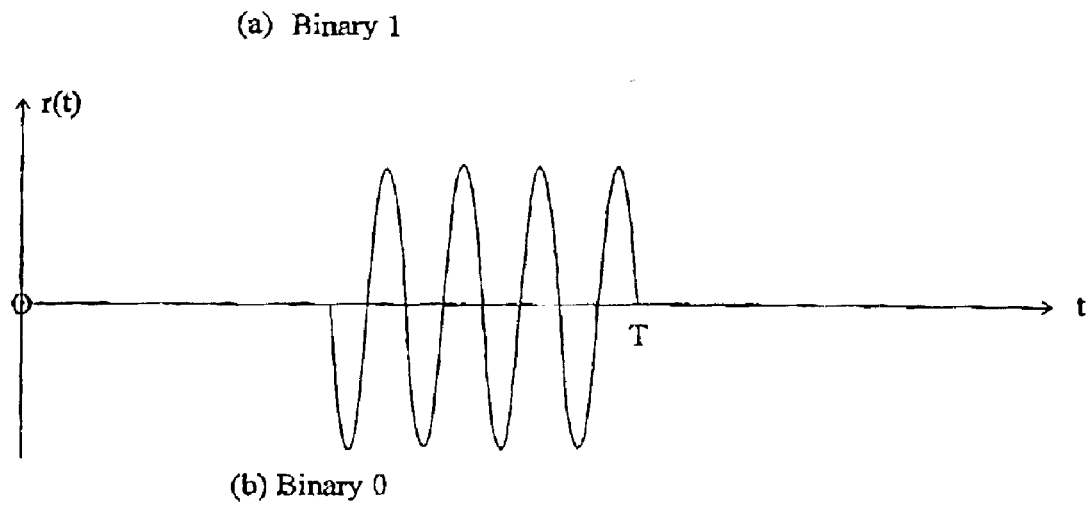
Figure 8:
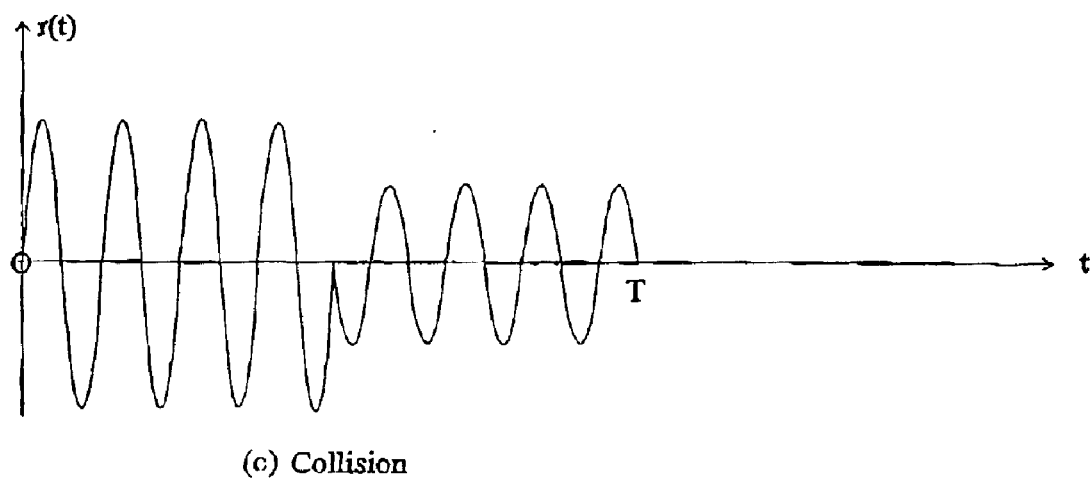

An illustration of a label reply modulation which may be used for collision detection is provided in FIG. 8, which shows in (a) a baseband modulation r(t) (herein referred to as 'the detected signal') detected in an interrogator when a binary 1 is signalled, in part (b) the detected signal when a binary 0 is signalled, and in (c) the detected signal when different labels at the same time signal a binary 1 and a binary 0. The absence of a period of silence in a position in which one is expected is evident in the Figure.

An advantage of this form of signalling is that collisions between reply signals from different labels which produce very different reply signal strengths in the receiver of the interrogator may still be detected.

In the STAR protocol when such collisions are detected, the labels which have produced such a reply collision but have unknowingly automatically retired from the current round are provided by the interrogator with notice of an error signal, which has the consequence of the retired label reentering a round.

Although as explained earlier they will not be read again in the current round, they will reply in a subsequent round, with a reduced probability of making a further collision.

A different class of interruptions in the interrogation field which is damaging to the efficient operation of a multi-read protocol are those which cause loss of operating voltage in the label electronics before all labels in the interrogation field are read.

Such interruptions can be caused by the movements of the label or by signal reflections from nearby electromagnetically reflective surfaces and objects.

The result can be a loss in interrogation field at the label's location. The result can then be that a label already read may upon the restoring of power re-enter a round and compete for attention with labels not yet read, thus reducing the efficiency of a multiple read process. We incorporate by cross reference AU/198/00017, Multiple Label Reading System, wherein it is explained that the impact of this phenomenon can be lessened by the use of a kernel or long term but still semi-volatile memory which retains information about the label's recent history, and in particular whether it was in an ACTIVE or RETIRED state when power was briefly lost as a result of the label movement or a deliberate field re-orientation process. It is intended that in one preferred implementation of the STAR protocol such facility be provided in the label.

In a further alternative embodiment of the invention, interrogator to label signalling of commands may based on evenly spaced interrogator pulse positions providing 1 in m PPM (for example 1 in 16 PPM). In this scheme a segment of a command field may consist of 16 positions which are timed by the label and the interrogator places a pulse in one of these 16 positions. Thus a pulse placed in such a segment represents a 4 bit binary value.

As an alternative to the command format shown in FIG. 3, a basic interrogator command signal may consist of 7 bits, providing for up to 128 distinct commands, and an 8 bit checksum. The checksum in the basic initial packet may be the polynomial $X^7+X^4+X^2+X^1+1$. The resulting 15 bit code words have a Hamming distance of 5, thus guaranteeing the detection of any 4 or fewer bit errors. A total of four pulses would have to be transmitted for the command and its CRC.

An advantage of using a form of signalling, wherein each pulse carries several bits of information, is that the lowering of the pulse duty cycle leads to the EMC regulations being more easily satisfied than with signalling schemes where pulses carry fewer bits of information.

A further advantage of the signalling scheme herein described is that pulses occur sufficiently frequently for their spectra, when the pulses are repeated at regular intervals, to have components separated by more than a bandwidth of a test receiver generally used for determination of sideband levels in EMC measurements.

A still further advantage of the signalling disclosed herein is that the pulses occur sufficiently rarely for the sideband levels to be lower than when the pulses occur more frequently.

It is commonly found in the prior art that signalling schemes have pulses which are either too frequent or too infrequent for the advantages mentioned above to be realised.

If a Gray code counter is used within the label for the 1 in 16 PPM decoding, then a data carrying pulse, misread by one position, would produce a one-bit error in the counter output. As the command code and checksum described has a Hamming distance of 5, this provides error detection for any 4 or fewer bit errors. By using a Gray code counter in the way described, even if all 4 pulses representing the binary data of the command and checksum code were shifted by plus or minus one position, the command would not be misinterpreted as another command.

An advantage therefore of this code and decoding structure is that error detection of commands in the interrogator to label signalling is made very robust against the types of errors which can occur with this form of signalling.

It will be appreciated that various alterations, modifications and/or additions may be introduced into the constructions and arrangements of parts previously described without departing from the spirit or ambit of the present invention.

What is claimed is:

1. A system for interrogating electronic labels, including:
   (a) one or more electronic labels, each attached to an object,
   (b) an interrogation device providing an interrogation field using an interrogation signal,
   (c) the interrogation signal containing information in the form of a plurality of symbols encoded into the interrogation signal, each symbol being represented in the form of at least one time interval between consecutive dips in amplitude of the interrogation signal, each time interval having a value selected from a finite set of values such that the ratio of any given time interval value to any smaller time interval value exceeds a predetermined amount,
   wherein an electronic label located within the interrogation field detects and decodes the interrogation signal to obtain the symbols, the electronic label also deriving electrical power from the interrogation field to interpret the recovered symbols and generate a reply signal, the reply signal being detected and decoded by the interrogation device, and wherein the predetermined amount exceeds an amount determined from a frequency variation of the electronic labels, the frequency variation being caused by a variation in the electrical power.

2. A system according to claim 1, wherein the predetermined amount exceeds 1.5.

3. A system according to claim 1, wherein predetermined amount exceeds 2.0.

4. A system according to claim 1, wherein the interrogation signal uses 1 in m pulse position or interval modulation.

5. A system according to claim 4, wherein the electronic label further includes a Gray code counter.

6. A system according to claim 1, wherein the reply signal includes periods of silence positioned so that at least a portion of the reply signal from a different electronic label replying at the same time is able to occupy the position of silence.

7. A system according to claim 1, wherein the available symbols include:
   (a) start of field symbol;
   (b) binary one symbol;
   (c) binary zero symbol; and
   (d) end of field symbol.

8. A system according to claim 7, wherein the predetermined value is used to distinguish between time intervals for a binary one symbol and a binary zero symbol, the predetermined value being obtained using a time interval contained in the start of field symbol.

9. A system according to claim 1, wherein each dip in a pair of consecutive dips corresponding to a symbol has a pulse width which is less than the time interval between the consecutive dips.

10. A system according to claim 1, wherein each dip has rise and fall times which are less than the pulse width of the dip.

11. A system according to claim 1, wherein the time interval between consecutive dips associated with a symbol is determined using the time difference between respective leading edges.

12. A system according to claim 1, wherein the interrogation device shapes the amplitude of the interrogation signal so as to include a localized period of slightly greater interrogator signal amplitude immediately preceding a rising edge and/or immediately following a falling edge associated with a dip.

13. A system according to claim 12, wherein the interrogation signal shaping device is a band pass filter.

14. A system according to claim 12, wherein the interrogation signal shaping device is a low pass filter.

15. A system for interrogating electronic labels, including:
   (a) one or more electronic labels, each attached to an object,
   (b) an interrogation device providing an interrogation field using an interrogation signal,
   (c) the interrogation signal containing information in the form of a plurality of symbols encoded into the interrogation signal, each symbol being represented in the form of at least one time interval between consecutive dips in amplitude of the interrogation signal, each time interval having a value selected from a finite set of values such that the ratio of any given time interval value to any smaller time interval value exceeds a predetermined amount,
   wherein an electronic label located within the interrogation field detects and decodes the interrogation signal to obtain the symbols, the electronic label also deriving electrical power from the interrogation field to interpret the recovered symbols and generate a reply signal, the reply signal being detected and decoded by the interrogation device, wherein each electronic label includes a combined dip detection and power supply circuit, the combined dip detection and power supply circuit being capable of converting the interrogation signal into a power signal and a data signal, and wherein the dip detection and power supply circuit includes a first and second input port, the first input port being coupled to both an anode of a first rectifier diode and an anode of a second rectifier diode, a cathode of the first rectifier diode being coupled to both a first terminal of a first reservoir capacitor and a first input of a comparator, a cathode of the second rectifier diode being coupled to both a first terminal of a second reservoir capacitor and a second input of the comparator, a second terminal of the first reservoir capacitor and a second terminal of the second reservoir capacitor both being coupled to the second input terminal, where in response to receiving an interrogation signal the comparator provides an output pulse during an interrogation signal dip but no output during slow variations in interrogation signal levels.

16. A system according to claim 15, wherein the first reservoir capacitor and the second reservoir capacitor have a substantially different capacitance.

17. A method of interrogating a plurality of electronic labels using an interrogation device, the method including:
   (a) the interrogation device generating an interrogation field, the interrogation field having an interrogation signal, the interrogation signal containing information in the form of a plurality of symbols, each symbol having at least one time interval between consecutive dips in amplitude of the interrogation signal, each time interval having a value from a finite set of values, the values ranging from a minimum to a maximum value, adjacent values having a higher to lower value ratio which exceeds a predetermined amount;
   (b) one or more of the electronic labels located within the interrogation field detecting and decoding the interrogation signal to obtain a power signal and a data signal, the data signal including the symbols;
   (c) the electronic labels using the power signal to interpret the recovered symbols; and
   (d) in response to interpreting the symbols the electronic labels responding to the interrogation signal,
   wherein the interrogation signal includes at least one command and the available types of commands include:
   (e) begin round command;
   (f) close empty slot command;
   (g) error command;
   (h) decoding error command;
   (i) begin new slot command; and
   (j) change round size command.

18. A method according to claim 17, wherein a begin round command may further include a label selection command, the label selection command including at least one label selection parameter.

19. A method according to claim 18, wherein the step of responding to the interrogation signal includes:
   (a) comparing the at least one label selection parameter with label identification data;
   (b) a label having identification data which matches the label selection data providing a reply signal, the reply signal including:
      (i) the remaining contents of the identification data; and
      (ii) a cyclic redundancy code (CRC) corresponding to the concatenation of the data used in the label selection and the data contained in its reply.

20. A method according to claim 17, wherein the step of responding to the interrogation signal includes:
   (a) each of the one or more receiving electronic labels entering an active state;
   (b) each receiving electronic label selecting a slot number from a maximum number of slots, wherein the slot number is representative of a period during which the receiving label is to reply to the interrogation signal;
   (c) each of the receiving electronic labels generating a reply signal;
   (d) the receiving electronic labels comparing a current slot number with the selected slot number;
   (e) in response to the current slot number equalling the selected slot number a receiving electronic label transmitting the reply signal;
   (f) the interrogation device receiving the transmitted reply signals; and
   (g) the receiving electronic labels entering a retired state.

21. A method according to claim 20, wherein the current slot is controlled by the interrogation device.

22. A method according to claim 20, wherein maximum number of slots in a round is stored within memory on board the electronic label.

23. A method according to claim 20, wherein the maximum number of slots in a round is contained within interrogator commands transmitted to the electronic labels.

* * * * *